(12) United States Patent
Gomez Angulo et al.

(10) Patent No.: US 10,741,906 B2
(45) Date of Patent: Aug. 11, 2020

(54) ELECTRONIC DEVICES HAVING COMMUNICATIONS AND RANGING CAPABILITIES

(71) Applicant: Apple Inc., Cupertino, CA (US)

(72) Inventors: Rodney A. Gomez Angulo, Santa Clara, CA (US); Bilgehan Avser, Mountain View, CA (US); Harish Rajagopalan, San Jose, CA (US); Simone Paulotto, Redwood City, CA (US); Jennifer M. Edwards, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 16/146,556

(22) Filed: Sep. 28, 2018

(65) Prior Publication Data
US 2020/0106158 A1    Apr. 2, 2020

(51) Int. Cl.
*H01Q 1/38* (2006.01)
*H01Q 1/24* (2006.01)
*G06F 1/16* (2006.01)

(52) U.S. Cl.
CPC .......... *H01Q 1/243* (2013.01); *G06F 1/1698* (2013.01); *H01Q 1/38* (2013.01)

(58) Field of Classification Search
CPC ................. H01Q 1/243; H01Q 1/38
See application file for complete search history.

(56) References Cited

U.S. PATENT DOCUMENTS

| 7,595,759 | B2 | 9/2009 | Schlub et al. |
| 8,102,330 | B1 | 1/2012 | Albers |
| 10,042,050 | B2 | 8/2018 | De Mersseman et al. |
| 2005/0110685 | A1 | 5/2005 | Frederik du Toit |
| 2006/0267844 | A1 | 11/2006 | Yanagi et al. |
| 2008/0316121 | A1 | 12/2008 | Hobson et al. |
| 2014/0203995 | A1 | 7/2014 | Romney et al. |
| 2014/0210486 | A1 | 7/2014 | Dijkstra |
| 2015/0194730 | A1 | 7/2015 | Sudo et al. |

(Continued)

FOREIGN PATENT DOCUMENTS

| EP | 3312629 A2 | 4/2018 |
| JP | 2017085289 A | 5/2017 |
| KR | 101014347 B1 | 2/2011 |

OTHER PUBLICATIONS

Simone Paulotto et al., U.S. Appl. No. 15/650,627, filed Jul. 14, 2017.

*Primary Examiner* — Graham P Smith
(74) *Attorney, Agent, or Firm* — Treyz Law Group, P.C.; Michael H. Lyons

(57) ABSTRACT

An electronic device may be provided antennas and control circuitry. The antennas may be arranged in an array of unit cells. Each unit cell may include a first antenna that conveys signals in a first frequency band higher than 10 GHz and a second antenna that conveys radio-frequency signals in a second frequency band higher than the first frequency band. A first of the unit cells may be provided with a first set of antennas that transmits radio-frequency signals in a third frequency band higher than the second frequency band. A second of the antenna unit cells may be provided with a second set of antennas that receives the radio-frequency signals after being reflected off of external objects. The control circuitry may perform spatial ranging operations by processing the transmitted and received signals in the second frequency band.

20 Claims, 10 Drawing Sheets

(56) References Cited

U.S. PATENT DOCUMENTS

2015/0333407 A1  11/2015  Yamagajo et al.
2017/0256867 A1   9/2017  Ding et al.
2017/0285158 A1  10/2017  Halbert et al.
2018/0159203 A1   6/2018  Baks et al.
2018/0198204 A1   7/2018  Kovacic

ELECTRONIC DEVICES HAVING COMMUNICATIONS AND RANGING CAPABILITIES

BACKGROUND

This relates generally to electronic devices and, more particularly, to electronic devices with wireless circuitry.

Electronic devices often include wireless circuitry. For example, cellular telephones, computers, and other devices often contain antennas and wireless transceivers for supporting wireless communications.

It may be desirable to support wireless communications and spatial ranging operations at millimeter wave and centimeter wave frequencies. Millimeter wave communications, which are sometimes referred to as extremely high frequency (EHF) communications, and centimeter wave communications involve communications at frequencies of about 10-300 GHz. Operation at these frequencies may support high bandwidths, but may raise significant challenges. For example, millimeter wave signals generated by antennas can be characterized by substantial attenuation and/or distortion during signal propagation through various mediums. It may also be difficult to incorporate antennas for performing both wireless communications and spatial ranging operations within electronic devices, which are often subject to space constraints.

It would therefore be desirable to be able to provide electronic devices with improved wireless circuitry such as circuitry that supports millimeter and centimeter wave communications and spatial ranging operations.

SUMMARY

An electronic device may be provided with wireless circuitry and control circuitry. The wireless circuitry may perform wireless communications operations and/or spatial ranging operations using millimeter and centimeter wave signals conveyed by antennas.

The antennas may be arranged in an array of antenna unit cells on a substrate. Each antenna unit cell may include a first antenna that conveys radio-frequency signals in a first frequency band higher than 10 GHz and a second antenna that conveys radio-frequency signals in a second frequency band that is higher than the first frequency band. The first and second antennas may be used to perform bi-directional wireless communications with external wireless equipment. The first and second antennas may be stacked patch antennas, for example. The first and second antennas in each antenna unit cell across the array may collectively form a phased antenna array.

A first of the antenna unit cells may be provided with a first set of antennas that transmits radio-frequency signals in a third frequency band higher than the second frequency band. A second of the antenna unit cells may be provided with a second set of antennas that receives the radio-frequency signals after being reflected off of external objects. The control circuitry may perform spatial ranging operations by processing the transmitted and received signals in the second frequency band (e.g., to identify a range between the device and the external objects). The first set of antennas may be located at corners of the first antenna unit cell and closer to ground than the first and second antennas in the first antenna unit cell. The second set of antennas may be located at corners of the second antenna unit cell and closer to ground than the first and second antennas in the second antenna unit cell. The first and second antenna unit cells may be located at opposing sides of the array.

DETAILED DESCRIPTION

Figure 1:
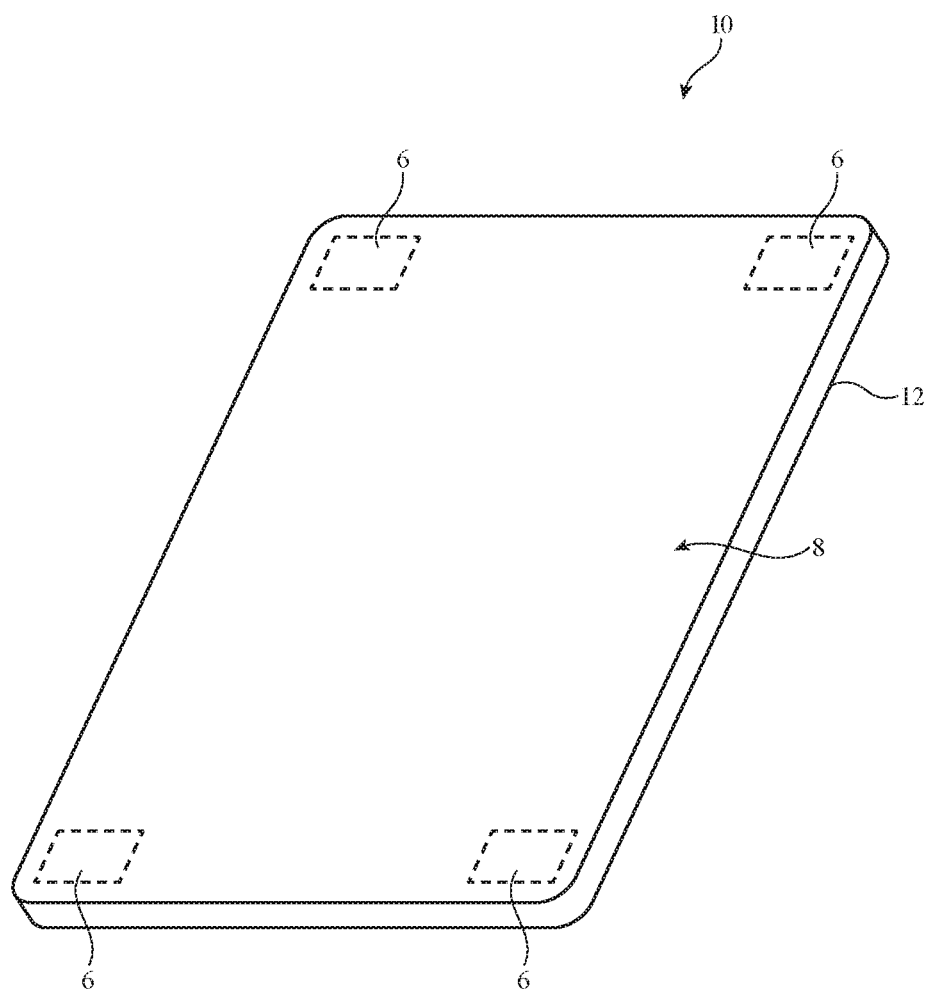
FIG. 1 is a perspective view of an illustrative electronic device with wireless circuitry in accordance with some embodiments.

An electronic device such as electronic device 10 of FIG. 1 may contain wireless circuitry. The wireless circuitry may include one or more antennas. The antennas may include phased antenna arrays that are used for handling millimeter wave and centimeter wave communications. Millimeter wave communications, which are sometimes referred to as extremely high frequency (EHF) communications, involve signals at 60 GHz or other frequencies between about 30 GHz and 300 GHz. Centimeter wave communications involve signals at frequencies between about 10 GHz and 30 GHz. The electronic device may include antennas for performing wireless communications and/or spatial ranging operations using signals at these frequencies. If desired, device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a keyboard, a gaming controller, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectric. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that may implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display cover layer that is used in covering and protecting display 8 on the front of device 10, under a dielectric window on a rear face of housing 12 or the edge of housing 12, or elsewhere in device 10.

Figure 2:
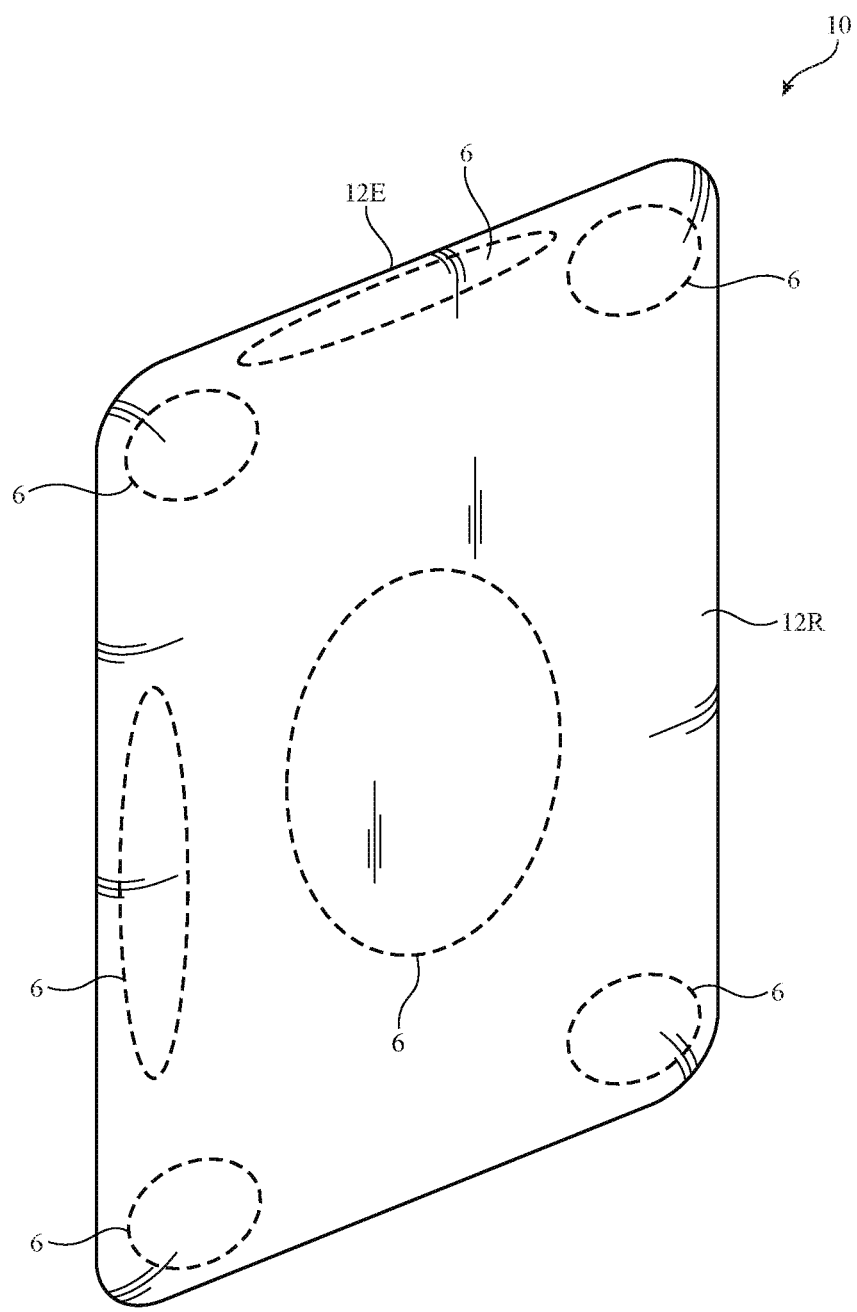
FIG. 2 is a rear perspective view of an illustrative electronic device in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing portion (wall) 12R, in the center of rear housing wall 12R (e.g., under a dielectric window structure or other antenna window in the center of rear housing 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric, the antennas may transmit and receive antenna signals through any suitable portion of the dielectric. In configurations in which housing 12 is formed from a conductive material such as metal, regions of the housing such as slots or other openings in the metal may be filled with plastic or other dielectric. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

Figure 3:
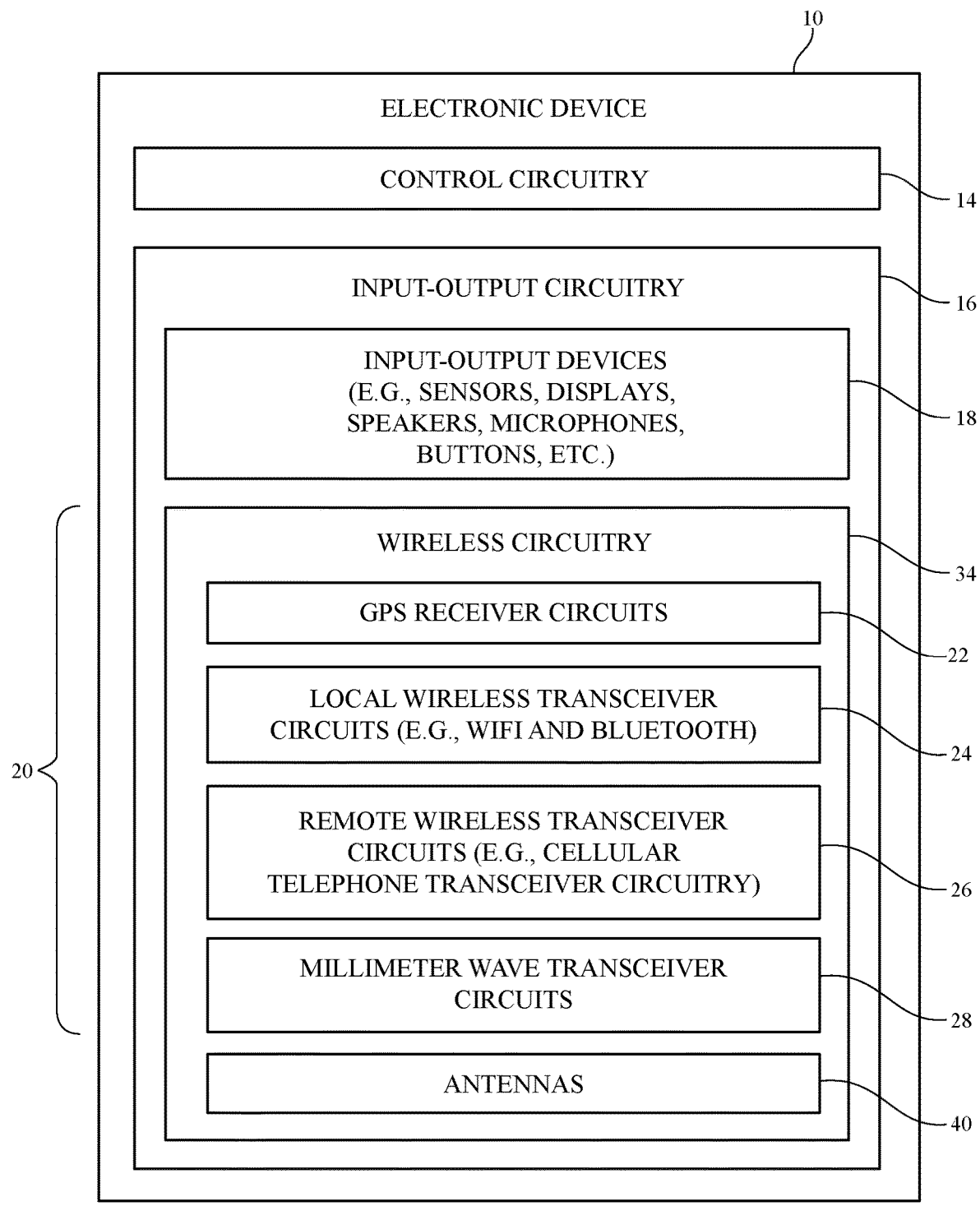
FIG. 3 is a schematic diagram of an illustrative electronic device with wireless circuitry in accordance with some embodiments.

A schematic diagram showing illustrative components that may be used in device 10 is shown in FIG. 3. As shown in FIG. 3, device 10 may include storage and processing circuitry such as control circuitry 14. Control circuitry 14 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 14 may be used to control the operation of device 10. This processing circuitry may be based on one or more microprocessors, microcontrollers, digital signal processors, host processors, baseband processor integrated circuits, application specific integrated circuits, etc.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

The control circuitry in device 10 (e.g., control circuitry 14) may be configured to perform operations in device 10 using hardware (e.g., dedicated hardware or circuitry), firmware, and/or software. Software code for performing operations in device 10 is stored on non-transitory computer readable storage media (e.g., tangible computer readable storage media) in control circuitry 14. The software code may sometimes be referred to as program instructions, software, data, instructions, or code. The non-transitory computer readable storage media may include non-volatile memory such as non-volatile random-access memory (NVRAM), one or more hard drives (e.g., magnetic drives or solid state drives), one or more removable flash drives or other removable media, etc. Software stored on the non-transitory computer readable storage media may be executed on the processing circuitry of control circuitry 14. The processing circuitry may include application-specific integrated circuits with processing circuitry, one or more microprocessors, a central processing unit (CPU) or other processing circuitry.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless circuitry 34 for communicating wirelessly with external equipment and/or for performing spatial ranging operations. Wireless circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless circuitry 34 may include radio-frequency transceiver circuitry 20 for handling various radio-frequency communications bands. For example, transceiver circuitry 20 may include Global Positioning System (GPS) receiver circuits 22, local wireless transceiver circuits 24, remote wireless transceiver circuits 26, and/or millimeter wave transceiver circuits 28.

Local wireless transceiver circuits 24 may include wireless local area network (WLAN) transceiver circuitry and may therefore sometimes be referred to herein as WLAN transceiver circuitry 24. WLAN transceiver circuitry 24 may handle 2.4 GHz and 5 GHz bands for WiFi® (IEEE 802.11) communications and may handle the 2.4 GHz Bluetooth® communications band.

Remote wireless transceiver circuits 26 may include cellular telephone transceiver circuitry and may therefore sometimes be referred to herein as cellular telephone transceiver circuitry 26. Cellular telephone transceiver circuitry 26 may handle wireless communications in frequency ranges such as a communications band from 700 to 960 MHz, a communications band from 1710 to 2170 MHz, and a communications band from 2300 to 2700 MHz or other communications bands between 600 MHz and 4000 MHz or other suitable frequencies (as examples). Cellular telephone transceiver circuitry 26 may handle voice data and non-voice data.

Millimeter wave transceiver circuits 28 (sometimes referred to herein as extremely high frequency (EHF) transceiver circuitry 28 or millimeter wave transceiver circuitry 28) may support communications at frequencies between about 10 GHz and 300 GHz. For example, millimeter wave transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter wave transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter wave transceiver circuitry 28 may support IEEE 802.11ad communications at 60 GHz and/or $5^{th}$ generation mobile networks or $5^{th}$ generation wireless systems (5G) communications bands between 27 GHz and 90 GHz. If desired, millimeter wave transceiver circuitry 28 may support communications at multiple frequency bands between 10 GHz and 300 GHz such as a first band from 27.5 GHz to 29.5 GHz, a second band from 37 GHz to 41 GHz, a third band from 57 GHz to 71 GHz, and/or other communications bands between 10 GHz and 300 GHz. Millimeter wave transceiver circuitry 28 may be formed from one or more integrated circuits (e.g., multiple integrated circuits mounted on a common printed circuit in a system-in-package device, one or more integrated circuits mounted on different substrates, etc.).

While circuitry 28 is sometimes referred to herein as millimeter wave transceiver circuitry 28, millimeter wave transceiver circuitry 28 may handle communications at any desired communications bands at frequencies between 10 GHz and 300 GHz (e.g., in millimeter wave communications bands, centimeter wave communications bands, etc.). In one suitable arrangement that is sometimes described herein as an example, millimeter wave transceiver circuitry 28 may include spatial ranging circuitry (e.g., millimeter wave spatial ranging circuitry) that performs spatial ranging operations using millimeter and/or centimeter wave signals transmitted and received by antennas 40. The spatial ranging circuitry may use the transmitted and received signals to detect or estimate a range between device 10 and external objects in the surroundings of device 10 (e.g., objects external to housing 12 and device 10 such as the body of the user or other persons, other devices, animals, furniture, walls, or other objects or obstacles in the vicinity of device 10).

GPS receiver circuits 22 may receive GPS signals at 1575 MHz or signals for handling other satellite positioning data (e.g., GLONASS signals at 1609 MHz). Satellite navigation system signals for GPS receiver circuits 22 are received from a constellation of satellites orbiting the earth.

Wireless circuitry 34 can include circuitry for other short-range and long-range wireless links if desired. For example, wireless circuitry 34 may include circuitry for receiving television and radio signals, paging system transceivers, near field communications (NFC) circuitry, etc.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Millimeter wave transceiver circuitry 28 may convey signals over short distances that travel between transmitter and receiver over a line-of-sight path. To enhance signal reception for millimeter and centimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Dedicated antennas may be used for performing millimeter and centimeter wave spatial ranging operations if desired. Antennas 40 may include antennas arranged in one or more phased antenna arrays for handling millimeter and centimeter wave communications and/or for handling spatial ranging operations.

Transmission line paths may be used to route antenna signals within device 10. For example, transmission line paths may be used to couple antennas 40 to transceiver circuitry 20. Transmission line paths in device 10 (sometimes referred to herein as transmission lines) may include coaxial cables, coaxial probes realized by metalized vias, microstrip transmission lines, stripline transmission lines, edge-coupled microstrip transmission lines, edge-coupled stripline transmission lines, waveguide structures, transmission lines formed from combinations of transmission lines of these types, etc.

If desired, transmission lines in device 10 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

In devices such as handheld devices, the presence of an external object such as the hand of a user or a table or other surface on which a device is resting has a potential to block wireless signals such as millimeter wave signals. Accordingly, it may be desirable to incorporate multiple antennas or phased antenna arrays into device 10, each of which is placed at a different location within device 10. With this type of arrangement, an unblocked antenna or phased antenna array may be switched into use. In scenarios where a phased antenna array is formed in device 10, once switched into use, the phased antenna array may use beam steering to optimize wireless performance. Configurations in which antennas from one or more different locations in device 10 are operated together may also be used.

In devices with phased antenna arrays, wireless circuitry 34 may include gain and phase adjustment circuitry that is used in adjusting the signals associated with each antenna 40 in the phased antenna array (e.g., to perform beam steering to point a signal beam of the phased antenna array in a desired pointing direction). Switching circuitry may be used to switch desired antennas 40 into and out of use. If desired, each of locations 6 of FIGS. 1 and 2 may include multiple antennas 40 (e.g., a set of three antennas or more than three or fewer than three antennas in a phased antenna array) and, if desired, one or more antennas from one of locations 6 may be used in transmitting and receiving signals while using one or more antennas from another of locations 6 in transmitting and receiving signals.

Figure 4:
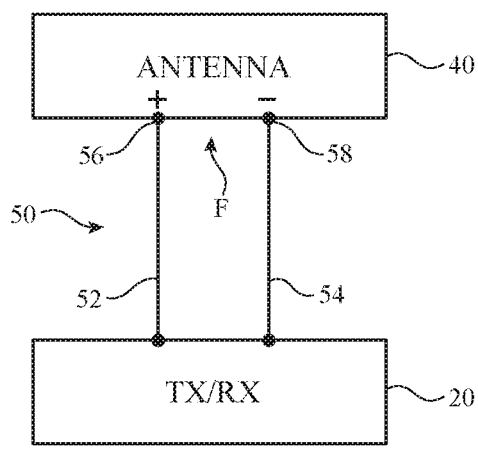
FIG. 4 is a diagram of an illustrative transceiver circuit and antenna in accordance with some embodiments.

A schematic diagram of an antenna 40 coupled to transceiver circuitry 20 (e.g., millimeter wave transceiver circuitry 28 of FIG. 3) is shown in FIG. 4. As shown in FIG. 4, radio-frequency transceiver circuitry 20 may be coupled to antenna feed F of antenna 40 using transmission line 50. Antenna feed F may include a positive antenna feed terminal such as positive antenna feed terminal 56 and may include a ground antenna feed terminal such as ground antenna feed terminal 58. Transmission line 50 may be formed form metal traces on a printed circuit or other conductive structures and may have a positive transmission line signal path such as path 52 that is coupled to positive antenna feed terminal 56 and a ground transmission line signal path such as path 54 that is coupled to ground antenna feed terminal 58. Path 52 may sometimes be referred to herein as signal conductor 52. Path 54 may sometimes be referred to herein as ground conductor 54.

Device 10 may contain multiple antennas 40. The antennas may be used together or one of the antennas may be switched into use while other antenna(s) are switched out of use. If desired, control circuitry 14 (FIG. 3) may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40.

In some configurations, antennas 40 may be arranged in one or more antenna arrays (e.g., phased antenna arrays to implement beam steering functions). For example, the antennas that are used in handling millimeter and centimeter wave signals for millimeter wave transceiver circuitry 28 may be implemented as phased antenna arrays. The radiating elements in a phased antenna array for supporting millimeter and centimeter wave communications may be patch antennas (e.g., stacked patch antennas), dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

In one suitable arrangement that is sometimes described herein as an example, patch antenna structures may be used for implementing antenna 40. Antennas 40 that are implemented using patch antenna structures may sometimes be referred to herein as patch antennas. An illustrative patch antenna is shown in FIG. 5.

Figure 5:
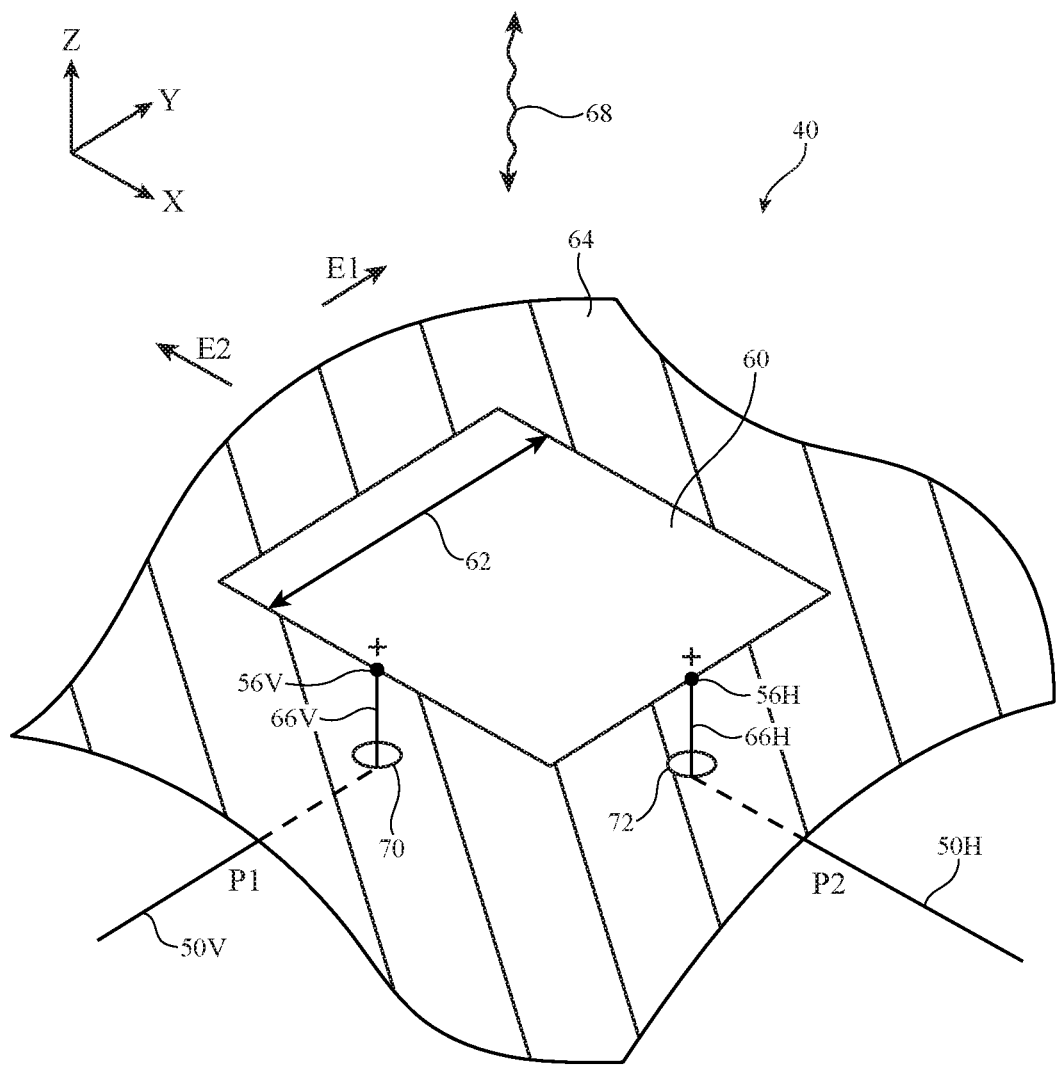
FIG. 5 is a perspective view of an illustrative patch antenna with dual ports in accordance with some embodiments.

As shown in FIG. 5, antenna 40 may have a patch antenna resonating element 60 that is separated from and parallel to a ground plane such as antenna ground plane 64 (sometimes referred to herein as antenna ground 64). Patch antenna resonating element 60 may lie within a plane such as the X-Y plane of FIG. 5 (e.g., the lateral surface area of element 60 may lie in the X-Y plane). Patch antenna resonating element 60 may sometimes be referred to herein as patch 60, patch element 60, patch resonating element 60, antenna resonating element 60, or resonating element 60. Antenna ground 64 may lie within a plane that is parallel to the plane of patch element 60. Patch element 60 and antenna ground 64 may therefore lie in separate parallel planes that are separated by a fixed distance. Patch element 60 and antenna ground 64 may be formed from conductive traces patterned on a dielectric substrate such as a rigid or flexible printed circuit board substrate, metal foil, stamped sheet metal, electronic device housing structures, or any other desired conductive structures.

The length of the sides of patch element 60 may be selected so that antenna 40 resonates (radiates) at a desired operating frequency. For example, the sides of patch element 60 may each have a length 62 that is approximately equal to half of the wavelength of the signals conveyed by antenna 40 (e.g., the effective wavelength given the dielectric properties of the materials surrounding patch element 60). In one suitable arrangement, length 62 may be between 0.8 mm and 1.2 mm (e.g., approximately 1.1 mm) for covering a millimeter wave frequency band between 57 GHz and 70 GHz, as just one example.

The example of FIG. 5 is merely illustrative. Patch element 60 may have a square shape in which all of the sides of patch element 60 are the same length or may have a different rectangular shape. Patch element 60 may be formed in other shapes having any desired number of straight and/or curved edges. If desired, patch element 60 and antenna ground 64 may have different shapes and relative orientations.

To enhance the polarizations handled by antenna 40, antenna 40 may be provided with multiple feeds. As shown in FIG. 5, antenna 40 may have a first feed at antenna port P1 that is coupled to a first transmission line path 50 such as transmission line path 50V and a second feed at antenna port P2 that is coupled to a second transmission line path 50 such as transmission line path 50H. The first antenna feed may have a first ground antenna feed terminal coupled to antenna ground 64 (not shown in FIG. 5 for the sake of clarity) and a first positive antenna feed terminal 56 such as positive antenna feed terminal 56V coupled to patch element 60. The second antenna feed may have a second ground antenna feed terminal coupled to antenna ground 64 (not shown in FIG. 5 for the sake of clarity) and a second positive antenna feed terminal 56 such as positive antenna feed terminal 56H coupled to patch element 60.

Holes or openings such as openings 70 and 72 may be formed in antenna ground 64. Transmission line path 50V may include a vertical conductor 66V (e.g., a conductive through-via, conductive pin, metal pillar, solder bump, combinations of these, or other vertical conductive interconnect structures) that extends through hole 70 to positive antenna feed terminal 56V on patch element 60. Transmission line path 50H may include a vertical conductor 66H that extends through hole 72 to positive antenna feed terminal 56H on patch element 60. This example is merely illustrative and, if desired, other transmission line structures may be used (e.g., coaxial cable structures, stripline transmission line structures, etc.).

When using the first antenna feed associated with port P1, antenna 40 may transmit and/or receive radio-frequency signals having a first linear polarization (e.g., the electric field E1 of antenna signals 68 associated with port P1 may be oriented parallel to the Y-axis in FIG. 5). When using the antenna feed associated with port P2, antenna 40 may transmit and/or receive radio-frequency signals having a second linear polarization (e.g., the electric field E2 of antenna signals 68 associated with port P2 may be oriented parallel to the X-axis of FIG. 5 so that the linear polarizations associated with ports P1 and P2 are orthogonal to each other).

One of ports P1 and P2 may be used at a given time so that antenna 40 operates as a single-polarization antenna or both ports may be operated at the same time so that antenna 40 operates with other polarizations (e.g., as a dual-polarization antenna, a circularly-polarized antenna, an elliptically-polarized antenna, etc.). If desired, the active port may be changed over time so that antenna 40 can switch between covering vertical or horizontal polarizations at a given time. Ports P1 and P2 may be coupled to different phase and magnitude controllers or may both be coupled to the same phase and magnitude controller (e.g., in scenarios where antenna 40 is formed within a phased antenna array). If desired, ports P1 and P2 may both be operated with the same phase and magnitude at a given time (e.g., when antenna 40 acts as a dual-polarization antenna). If desired, the phases and magnitudes of the radio-frequency signals conveyed over ports P1 and P2 may be controlled separately and varied over time so that antenna 40 exhibits other polarizations (e.g., circular or elliptical polarizations).

If care is not taken, antennas 40 such as dual-polarization patch antennas of the type shown in FIG. 5 may have insufficient bandwidth for covering an entirety of a communications band of interest (e.g., a communications band at frequencies greater than 10 GHz). If desired, antenna 40 may include one or more parasitic antenna resonating elements that serve to broaden the bandwidth of antenna 40 (e.g., to extend the bandwidth of antenna 40 to cover an entirety of a corresponding communications band). The parasitic antenna resonating elements may include one or more conductive patches located above patch element 60, as an example. The length of the parasitic antenna resonating element may be greater than or less than the length of patch element 60 to add additional resonances that broaden the bandwidth of the antenna. The parasitic antenna resonating element may have a cross shape for impedance matching if desired.

Figure 6:
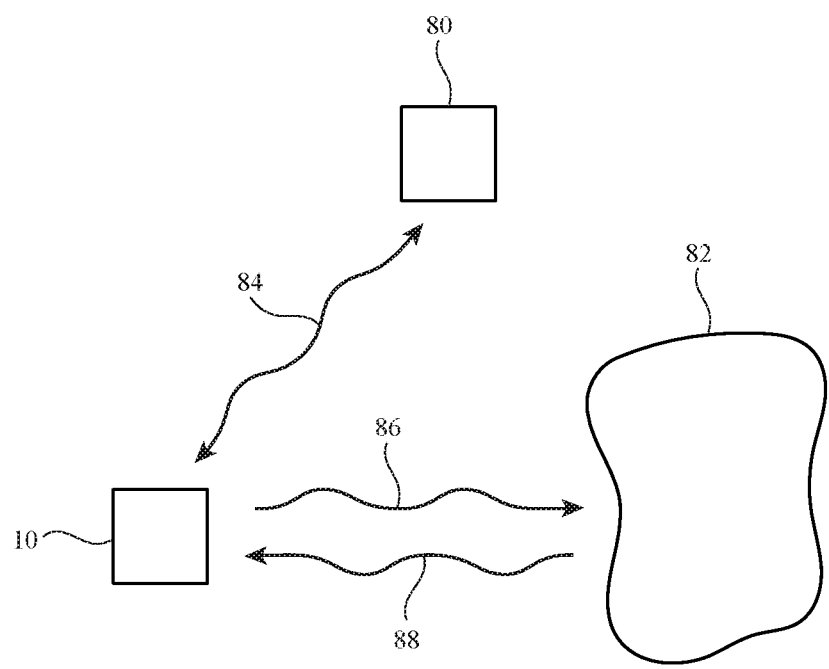
FIG. 6 is a diagram of an illustrative electronic device that performs both wireless communications and spatial ranging operations using antennas in accordance with some embodiments.

Device 10 may perform both wireless communications and spatial ranging operations using millimeter and centimeter wave signals (e.g., using millimeter wave transceiver circuitry 28 of FIG. 3). FIG. 6 is a diagram showing how device 10 may perform both wireless communications and spatial ranging operations. As shown in FIG. 6, device 10 may convey radio-frequency signals at millimeter and centimeter wave frequencies with external wireless equipment such as external device 80 over wireless communications link 84.

External device 80 may be an electronic device such as a wireless base station, a wireless access point, an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a desktop computer, a keyboard, a gaming controller, a computer mouse, a mousepad, a trackpad, or touchpad, as examples.

At the same time, device 10 may transmit radio-frequency signals 86 (e.g., at millimeter or centimeter wave frequencies). Device 10 may receive reflected radio-frequency signals 88 that are a reflected version of the transmitted radio-frequency signals 86 that have been reflected off of external object 82. Device 10 may process radio-frequency signals 86 and 88 to identify a distance (range) between device 10 and external object 82 (e.g., by comparing the time at which radio-frequency signals 88 are received with a timestamp in transmitted radio-frequency signals 86, etc.). Device 10 may perform any desired spatial ranging operations using radio-frequency signals 86 and 88 (e.g., range detection operations, external object detection operations, external object tracking operations, etc.).

Wireless communications link 84 may be a two-way communications link (e.g., a communications link maintained using a millimeter wave communications protocol). When performing two-way communications, millimeter wave transceiver circuitry 28 on device 10 (FIG. 3) may encode wireless data using the millimeter wave communications protocol, may transmit the wireless data to external device 80 at millimeter or centimeter wave frequencies, may receive wireless data transmitted by the external device 80 at millimeter or centimeter wave frequencies, and may decode the received wireless data using the millimeter wave communications protocol. Such millimeter wave communications protocols may include, for example, IEEE 802.11ad communications protocols or $5^{th}$ generation wireless systems (5G) communications protocols.

The spatial ranging operations performed by millimeter wave transceiver circuitry 28 (FIG. 3) using radio-frequency signals 86 and 88 of FIG. 6 involve one-way communications that do not require external communications equipment. In performing spatial ranging operations, millimeter wave transceiver circuitry 28 may transmit radio-frequency signals 86 such that the signals include a sequence (series) of pulses or other predetermined signals at millimeter or centimeter wave frequencies (e.g., based on a RADAR protocol or other range or object detection protocol). Millimeter wave transceiver circuitry 28 may then wait for receipt reflected radio-frequency signals 88 that have been reflected off of external object 82. Upon receiving the reflected version of the transmitted signal, millimeter wave transceiver circuitry 28 or control circuitry 14 (FIG. 3) may compare the transmitted radio-frequency signals 86 (e.g., the sequence of pulses in the transmitted signal) to the received radio-frequency signals 88 (e.g., the sequence of pulses in the received signal) to identify a distance between device 10 and external object 82 (e.g., based on a time delay between the transmitted signal and the received signal and the known propagation speed of the signals over the air and using the range or object detection protocol). The sequence of pulses may, for example, allow millimeter wave transceiver circuitry 28 to identify that any given received signal is a reflected version of the transmitted signal instead of some other signal received at device 10 (e.g., because the sequence of pulses will be the same for the reflected signal as the known sequence of pulses in the transmitted signal).

Device 10 may convey radio-frequency signals over wireless communications link 84 within first and/or second low frequency bands (e.g., frequency bands from 27.5 GHz to 29.5 GHz or a frequency band from 37 GHz to 41 GHz). Device 10 may transmit radio-frequency signals 86 within a high frequency band (e.g., a frequency band from 57 GHz to 71 GHz). Device 10 may also perform bi-directional communications within the high frequency band if desired. Device 10 may include a first set of antennas 40 (e.g., a phased antenna array) for handling wireless communications link 84. Device 10 and may include a second set of antennas 40 (e.g., one or more antennas arranged in an array pattern that may or may not be operated as a phased antenna array) for transmitting radio-frequency signals 86. Device 10 may include a third set of antennas 40 (e.g., one or more antennas arranged in an array pattern that may or may not be operated as a phased antenna array) for receiving radio-frequency signals 88. If desired, the same set of antennas may be used to both transmit radio-frequency signals 86 and to receive radio-frequency signals 88.

Figure 7:
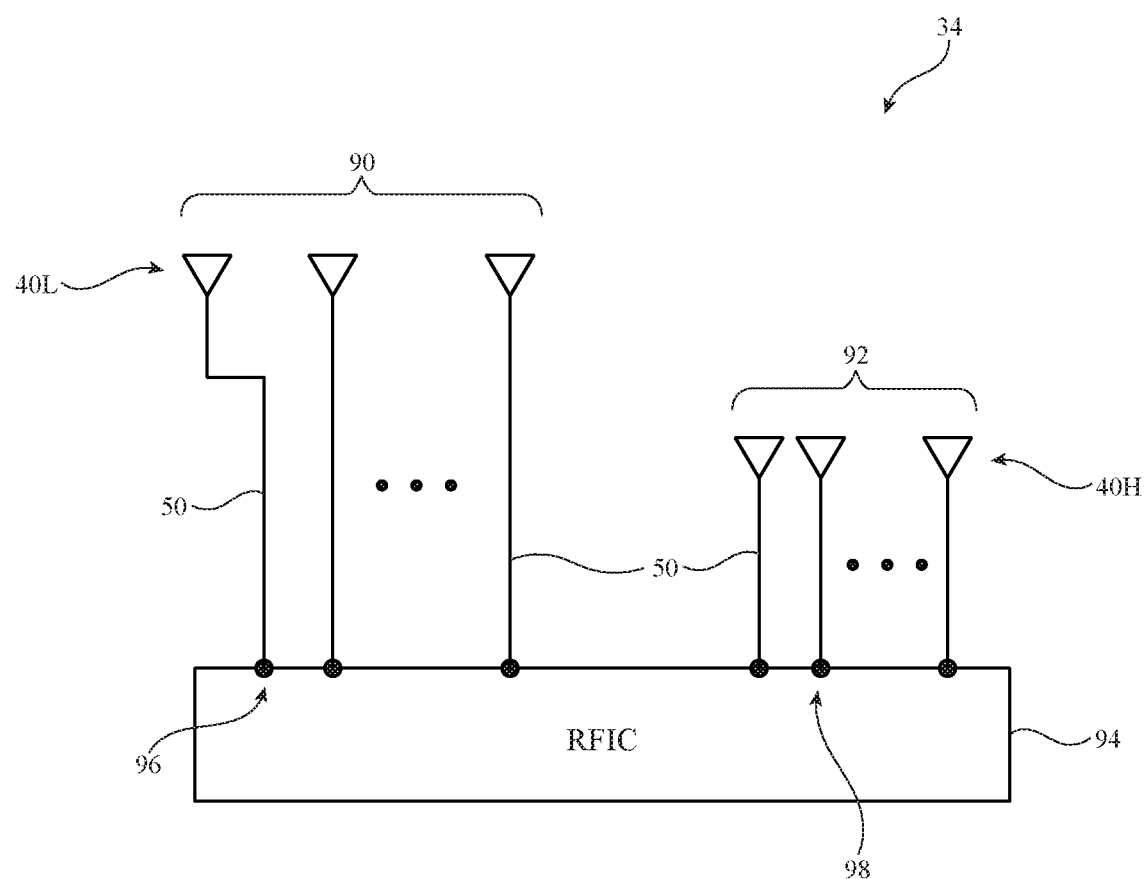
FIG. 7 is a diagram of illustrative wireless circuitry having separate sets of antennas for performing wireless communications and/or spatial ranging operations in different frequency bands in accordance with some embodiments.

FIG. 7 is a diagram showing how wireless circuitry 34 on device 10 may include different sets of antennas for performing wireless communications and spatial ranging operations. As shown in FIG. 7, wireless circuitry 34 may include a first set 90 of antennas 40L that handle radio-frequency signals in first and second low frequency band (e.g., a frequency band from 27.5 GHz to 29.5 GHz and a frequency band from 37 GHz to 41 GHz). Wireless circuitry 34 may also include a second set 92 of antennas 40H that handle radio-frequency signals in a high frequency band that is higher than the first and second low frequency bands (e.g., a frequency band from 57 GHz to 71 GHz). The antennas 40L in set 90 may handle wireless communications over wireless communications link 84 of FIG. 6 whereas the antennas 40H in set 92 may handle spatial ranging operations associated with radio-frequency signals 86 and 88 of FIG. 6. Set 92 may include a first subset of antennas for transmitting radio-frequency signals 86 of FIG. 6 and may include a second subset of antennas for receiving radio-frequency signals 88 of FIG. 6 in one suitable arrangement. If desired, the same antennas 40H in set 92 may both transmit radio-frequency signals 86 and receive radio-frequency signals 88.

The antennas 40L in set 90 may be operated using selected phases and magnitudes to form a single phased antenna array if desired (e.g., set 90 may sometimes be referred to herein as phased antenna array 90 or phased array 90 of antennas 40L). Antennas 40L in set 90 may sometimes be referred to collectively as a phased array antenna. The antennas 40H in set 92 may be operated using selected phases and magnitudes to form a single phased antenna array if desired (e.g., set 92 may sometimes be referred to herein as phased antenna array 92). In another suitable arrangement, antennas 40H in set 92 may transmit and receive millimeter and centimeter wave signals without operating as a part of a phased antenna array.

As shown in FIG. 7, each antenna 40L in set 90 may be coupled to one or more ports 96 of radio-frequency integrated circuit (RFIC) 94 over corresponding transmission lines 50. Each antenna 40H in set 92 may be coupled to one or more ports 98 of RFIC 94 over corresponding transmission lines 50. RFIC 94 may include spatial ranging circuitry coupled to ports 98 (e.g., circuitry for transmitting radio-frequency signals 86 of FIG. 6 over one or more ports 98 and circuitry for receiving radio-frequency signals 88 of FIG. 6 over one or more ports 98). Ports 96 may handle radio-frequency signals at relatively low frequencies (e.g., the operating frequencies of antennas 40L) whereas ports 98 handle radio-frequency signals at relatively high frequencies (e.g., the operating frequencies of antennas 40H). RFIC 94 may, for example, form millimeter wave transceiver circuitry 28 of FIG. 3. The example of FIG. 7 is merely illustrative. In general, any desired number of integrated circuits may be used to implement millimeter wave transceiver circuitry 28 of FIG. 3 (e.g., a first integrated circuit may be coupled to set 90 and may include ports 96, a second integrated circuit may be coupled to set 92 and may include ports 98, multiple integrated circuits may be coupled to set 92, etc.).

Space is often at a premium within wireless electronic devices such as device 10. As such, it can be difficult to accommodate both set 90 of antennas 40L for maintaining wireless communications link 84 of FIG. 6 and set 92 of antennas 40H for performing spatial ranging operations within device 10 (e.g., given form factor constraints associated with housing 12 of FIG. 1, etc.). If desired, one or more of the antennas 40L in set 90 may be co-located with one or more antennas 40H in set 92 to more efficiently utilize space within device 10. However, if care is not taken, co-located antennas such as co-located antennas 40H and 40L may exhibit unsatisfactory radio-frequency performance.

Figure 8:
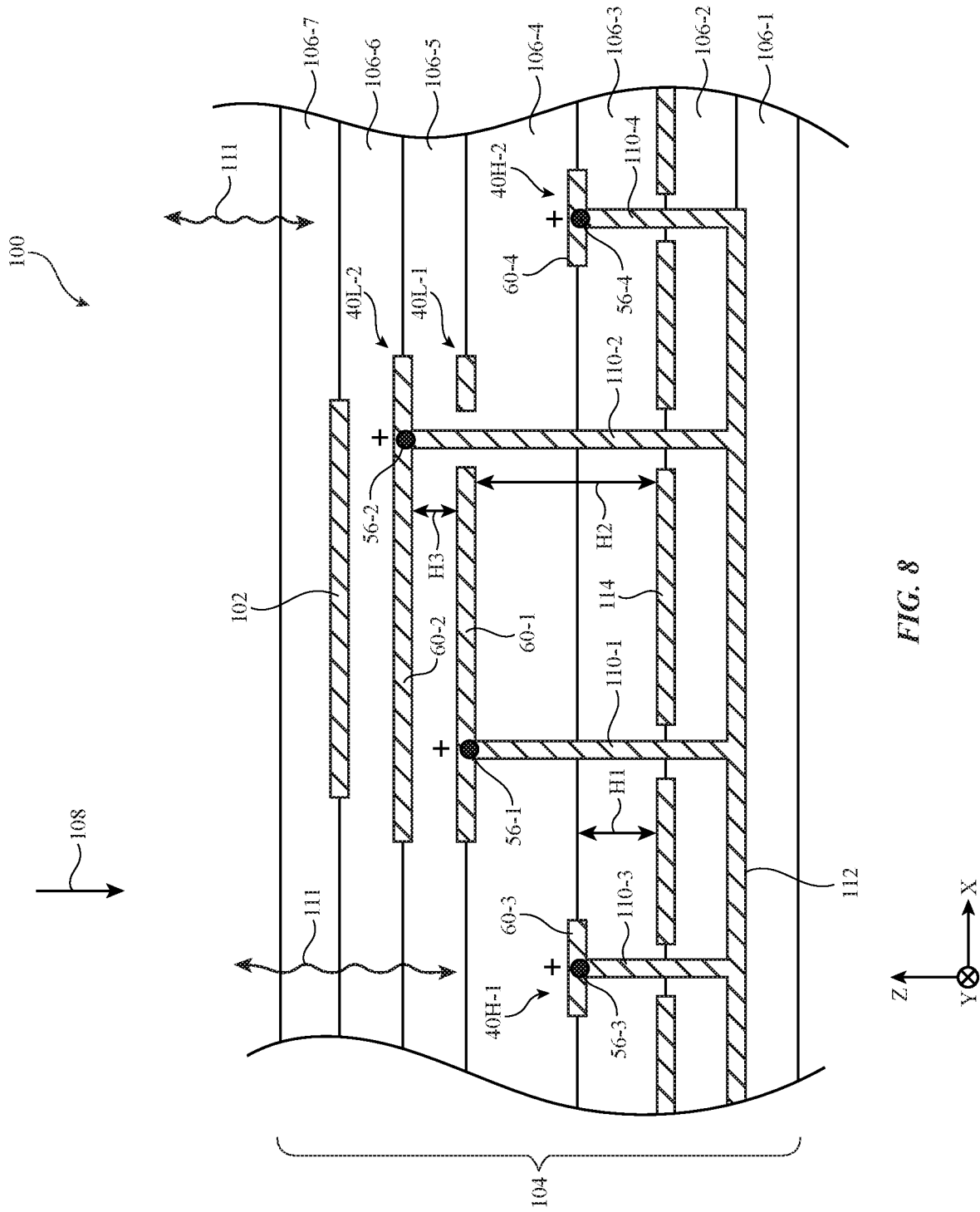
FIG. 8 is a cross-sectional side view of illustrative multi-band antenna structures having co-located patch antennas for performing wireless communications and/or spatial ranging operations in accordance with some embodiments.

FIG. 8 is a cross-sectional side view of multiple co-located antennas 40H and 40L that may exhibit satisfactory radio-frequency performance. As shown in FIG. 8, co-located antenna structures 100 may include multiple antennas 40L such as a first antenna 40L-1 and a second antenna 40L-2. Co-located antenna structures 100 may sometimes be referred to herein as a unit cell 100 of antennas or antenna unit cell 100. Antenna 40L-1 may cover a first low frequency band whereas antenna 40L-2 covers a second low frequency band at higher frequencies than the first low frequency band (so that unit cell 100 collectively covers both the first and second low frequency bands). For example, the first low frequency band may be a frequency band between 27.5 GHz and 29.5 GHz whereas the second low frequency band may be a frequency band between 37 GHz and 41 GHz. One of antennas 40L-1 and 40L-2 may be omitted if desired (e.g., so that unit cell 100 covers only one of the first and second low frequency bands).

As shown in FIG. 8, unit cell 100 may also include multiple antennas 40H such as a first antenna 40H-1 and a second antenna 40H-2. Antennas 40H-1 and 40H-2 may both cover a high frequency band (e.g., the same high frequency band such as a frequency band between 57 GHz and 71 GHz). In the example of FIG. 8, unit cell 100 is shown as including only two antennas 40H for the sake of clarity. In general, unit cell 100 may include any desired number of antennas 40H (e.g., one antenna 40H, three antennas 40H, four antennas 40H, etc.).

Antennas 40H-1, 40H-2, 40L-1 and 40L-2 may each be patch antennas such as the patch antenna shown in FIG. 5. Antennas 40H-1, 40H-2, 40L-1, and 40L-2 may each include a single antenna feed or may both include multiple antenna feeds for covering different polarizations. As shown in FIG. 8, antenna 40L-1 may include patch element 60-1, an antenna ground (e.g., antenna ground 64 of FIG. 5) formed using ground traces 114, and an antenna feed that includes a positive antenna feed terminal 56-1 coupled to patch element 60-1 and a corresponding ground antenna feed terminal coupled to ground traces 114. Similarly, antenna 40L-2 may include patch element 60-2, an antenna ground formed using ground traces 114, and an antenna feed that includes a positive antenna feed terminal 56-2 coupled to patch element 60-2 and a corresponding ground antenna feed terminal coupled to ground traces 114. Antenna 40H-1 may include patch element 60-3, an antenna ground formed using ground traces 114, and an antenna feed that includes a positive antenna feed terminal 56-3 coupled to patch element 60-2 and a corresponding ground antenna feed terminal coupled to ground traces 114. Similarly, antenna 40H-2 may include patch element 60-4, an antenna ground formed using ground traces 114, and an antenna feed that includes a positive antenna feed terminal 56-4 coupled to patch element 60-4 and a corresponding ground antenna feed terminal coupled to ground traces 114.

Patch elements 60-1, 60-2, 60-3, and 60-4 may each have lateral surfaces extending in the X-Y plane of FIG. 8. Patch elements 60-3 and 60-4 may each be separated from ground traces 114 (e.g., ground) by distance H1. Distance H1 may be, for example, between 0.1 mm and 0.5 mm, between 0.2 mm and 0.4 mm, approximately 0.3 mm, greater than 0.5 mm, less than 0.1 mm, or other distances. Patch element 60-1 may be separated from ground traces 114 by distance H2 that is greater than distance H1. Patch element 60-2 may be separated from patch element 60-1 by distance H3 and from ground traces 114 by distance H2+H3. In this way, the patch elements for antennas 40H-1 and 40H-2 in unit cell 100 may be closer to the antenna ground (e.g., ground traces 114) than the patch elements for antennas 40L-1 and 40L-2 in unit cell 100. This may serve to minimize interference between antennas 40H-1/40H-2 and antennas 40L-1/40L-2 in unit cell 100.

The patch elements for the antennas 40H-1 and 40H-2 in unit cell 100 may lie below the patch elements for the antennas 40L-1 and 40L-2 in unit cell 100 but without overlapping the lateral outline of the patch elements for the antennas 40L-1 and 40L-2. This may allow antennas 40H-1 and 40H-2 to convey radio-frequency signals 111 in the high communications band without significant shadowing by antennas 40L-1 and 40L-2. One or more parasitic antenna resonating elements such as parasitic element 102 (e.g., a conductive patch such as a cross-shaped conductive patch) may be mounted over patch element 60-2 and may serve to broaden the bandwidth of antenna 40L-2 and/or antenna 40L-1.

Antennas 40H-1, 40H-2, 40L-1, and 40L-2 of FIG. 8 may be formed on a dielectric substrate such as substrate 104. Substrate 104 may be, for example, a rigid or printed circuit board or other dielectric substrate. Substrate 104 may include multiple dielectric layers 106 (e.g., multiple layers ceramic or multiple layers of printed circuit board substrate such fiberglass-filled epoxy). Dielectric layers 106 may include a first dielectric layer 106-1, a second dielectric layer 106-2 over the first dielectric layer, a third dielectric layer 106-3 over the second dielectric layer, a fourth dielectric layer 106-4 over the third dielectric layer, a fifth dielectric layer 106-5 over the fourth dielectric layer, a sixth dielectric layer 106-6 over the fifth dielectric layer, and a seventh dielectric layer 106-7 over the sixth dielectric layer. Fewer or additional dielectric layers 106 may be stacked within substrate 104 if desired.

With this type of arrangement, antennas 40L-1, 40L-2, 40H-1, and 40H-2 may be embedded within the dielectric layers of substrate 104. For example, ground traces 114 (e.g., the antenna ground) may be formed on a surface of second dielectric layer 106-2, patch elements 60-3 and 60-4 may be formed from conductive traces on a surface of third dielectric layer 106-3, patch element 60-1 may be formed from a conductive trace on a surface of fourth dielectric layer 106-4, patch element 60-2 may be formed from a conductive trace on a surface of fifth dielectric layer 106-5, and parasitic element 102 may be formed from a conductive trace on a surface of sixth dielectric layer 106-6. Some or all of the lateral area of patch element 60-2 may overlap the lateral outline (footprint) of patch element 60-1 (in the X-Y plane). Antenna 40L-1 may radiate in the first low frequency band without significant signal blocking by antenna 40L-2.

Antennas 40L-1, 40L-2, 40H-1, and 40H-2 may be fed using respective transmission lines. The transmission lines may, for example, be formed from conductive traces 112 on dielectric layer 106-1 and portions of ground traces 114. Conductive traces 112 may form the signal conductor for the transmission lines associated with antennas 40L-1, 40L-2, 40H-1, and 40H-2. The transmission line for antenna 40H-1 may include a vertical conductive through-via 110-3 that extends from conductive traces 112 through dielectric layer 106-2, a hole in ground traces 114, and dielectric layer 106-3 to positive antenna feed terminal 56-3 on patch element 60-3. Similarly, the transmission line for antenna 40H-2 may include a vertical conductive through-via 110-4 that extends from conductive traces 112 through dielectric layer 106-2, a hole in ground traces 114, and dielectric layer 106-3 to positive antenna feed terminal 56-4 on patch element 60-4. The transmission line for antenna 40L-1 may include a vertical conductive through-via 110-1 that extends from conductive traces 112 through dielectric layer 106-2, a hole in ground traces 114, dielectric layer 106-3, and dielectric layer 106-4 to positive antenna feed terminal 56-1 on patch element 60-1. Similarly, the transmission line for antenna 40L-2 may include a vertical conductive through-via 110-2 that extends from conductive traces 112 through dielectric layer 106-2, a hole in ground traces 114, dielectric layer 106-3, dielectric layer 106-4, a hole in patch element 60-1, and dielectric layer 106-5 to positive antenna feed terminal 56-2 on patch element 60-2. This example is merely illustrative and, if desired, other transmission line structures may be used (e.g., coaxial cable structures, stripline transmission line structures, etc.).

When arranged in this way, antennas 40L-1, 40L-2, 40H-1, and 40H-2 may be co-located within the same volume while exhibiting satisfactory antenna efficiency in the first and second low frequency bands and in the high frequency band. Antennas 40H-1 and 40H-2 may, if desired, use radio-frequency signals 111 to perform spatial ranging operations without significant signal blocking by antennas 40L-1 and 40L-2 (e.g., radio-freuqency signals 111 of FIG. 8 may form radio-frequency signals 86 and/or 88 of FIG. 6).

The example of FIG. 8 is merely illustrative and, if desired, additional dielectric layers 106 may be interposed between any of the conductive traces in unit cell 100. In another suitable arrangement, substrate 104 may be formed from a single dielectric layer (e.g., antennas 40H-1, 40H-2, 40L-1, and 40L-2 may be embedded within a single dielectric layer such as a molded plastic layer). In yet another suitable arrangement, substrate 104 may be omitted and the antennas may be formed on other substrate structures or may be formed without substrates. In the example of FIG. 8, antennas 40H-1, 40H-2, 40L-1, and 40L-2 are shown as each having only a single feed for the sake of simplicity. In order to enhance the polarizations covered by unit cell 100, antennas 40H-1, 40H-2, 40L-1, and/or 40L-2 may be dual-polarized patch antennas that each have two corresponding feeds (e.g., as shown in FIG. 5).

Figure 9:
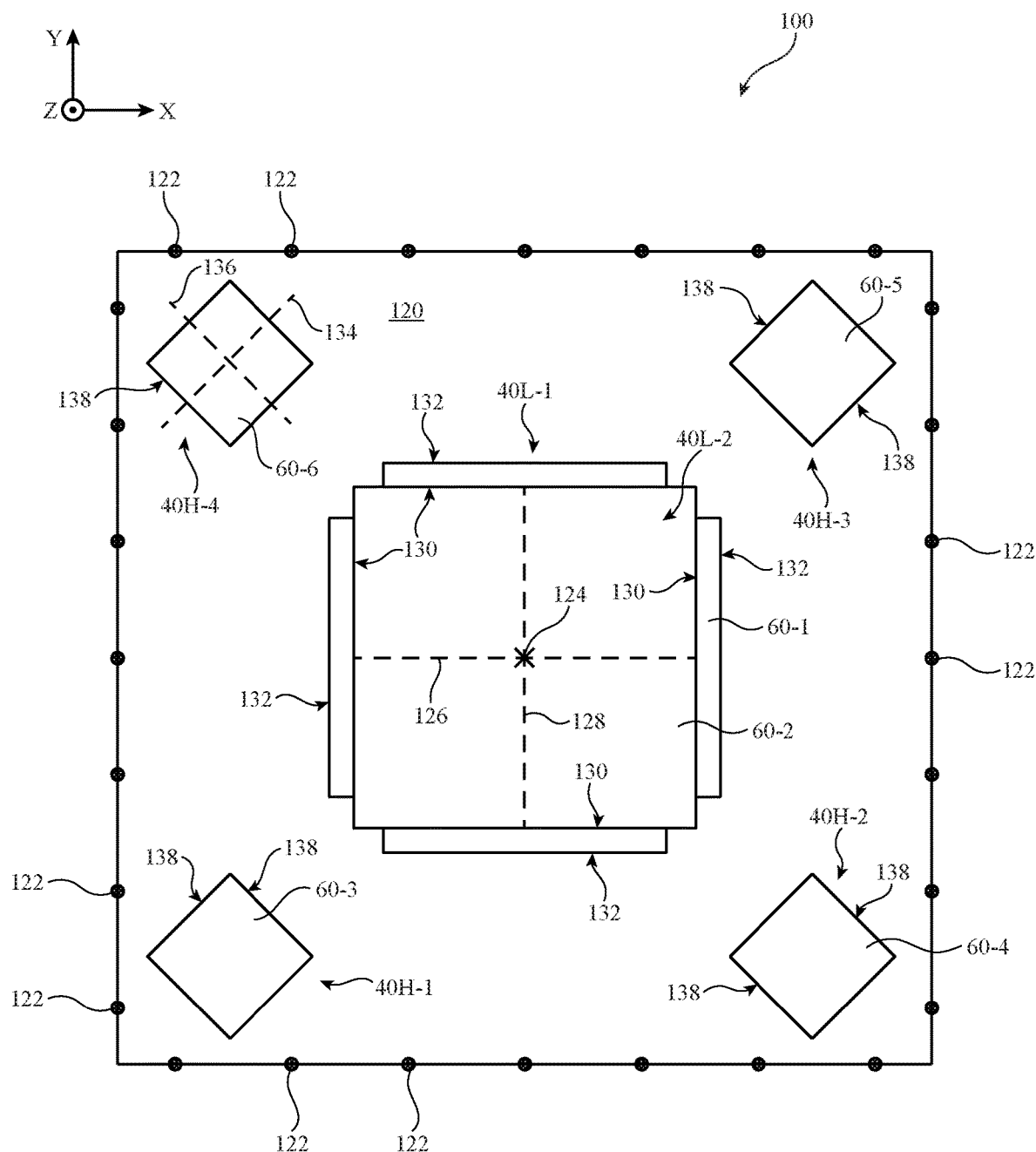
FIG. 9 is a top view of illustrative multi-band antenna structures having co-located patch antennas for performing wireless communications and/or spatial ranging operations in accordance with some embodiments.

FIG. 9 is a top view of unit cell 100 (e.g., as taken in the direction of arrow 108 of FIG. 8). As shown in FIG. 9, until cell 100 may include additional antennas 40H such as antennas 40H-3 and 40H-4. Antenna 40H-3 may include a corresponding patch element 60-5 and antenna 40H-4 may include a corresponding patch element 60-6 (e.g., patch elements formed from conductive traces on dielectric layer 106-3 of FIG. 8). In the example of FIG. 9, dielectric substrate 104 is not shown for the sake of clarity.

Antennas 40H-1, 40H-2, 40H-3, 40H-4, 40L-1, and 40L-2 may each be co-located within cavity (volume) 120. Cavity 120 may have conductive walls (edges) defined by ground traces 114 of FIG. 8 and sets (fences) of conductive vias 122. Conductive vias 122 may extend through substrate 104 of FIG. 8 from ground traces 114 to the top surface of substrate 104 and may laterally surround unit cell 100. Conductive vias 122 may be held at a ground or reference potential. The fences of conductive vias 122 for unit cell 100 may be opaque at frequencies covered by antennas 40H-1, 40H-2, 40H-3, 40H-4, 40L-1, and 40L-2. Each conductive via 122 may be separated from two adjacent conductive vias 170 by a distance (pitch) that is less than about ⅛ of the longest wavelength of operation of unit cell 100 (e.g., an effective wavelength in the first low frequency band after compensating for the dielectric effects of substrate 104 of FIG. 8). The fences of conductive vias 122 may be replaced with solid metal walls in another suitable arrangement (e.g., sheet metal walls, walls formed from conductive traces, integral portions of the housing of device 10, etc.). In yet another suitable arrangement, conductive vias 122 may be omitted and cavity 120 may not be laterally surrounded by any conductive walls.

Antennas 40L-1 and 40L-2 may be centered about point 124. Point 124 may lie at the center of cavity 120 (unit cell 100), as an example. Antennas 40H-1, 40H-2, 40H-3, and 40H-4 may be located at respective corners of cavity 120 and unit cell 100. For example, antenna 40H-1 may be located adjacent to the bottom-left corner of patch elements 60-1 and 60-2 (e.g., at the lower-left corner of cavity 120), antenna 40H-2 may be located adjacent to the bottom-right corner of patch elements 60-1 and 60-2 (e.g., at the lower-right corner of cavity 120), antenna 40H-3 may be located adjacent to the top-right corner of patch elements 60-1 and 60-2 (e.g., at the upper-right corner of cavity 120), and antenna 40H-4 may be located adjacent to the top-left corner of patch elements 60-1 and 60-2 (e.g., at the upper-left corner of cavity 120). Locating antennas 40H-1 through 40H-4 in this way may serve to minimize shadowing from antennas 40L-1 and 40L-2, for example.

By locating four antennas 40H-1, 40H-2, 40H-3, and 40H-4 within unit cell 100, antennas 40H-1, 40H-2, 40H-3, and 40H-4 in unit cell 100 may collectively cover a substantially uniform field of view over unit cell 100 (e.g., antenna 40H-2 may cover angles to the bottom-right of unit cell 100 that antenna 40H-4 cannot cover due to shadowing from antennas 40L-1 and 40L-2, antenna 40H-3 may cover angles to the top-right of unit cell 100 that antenna 40-1 cannot cover due to shadowing from antennas 40L-1 and 40L-2, etc.). In scenarios where unit cell 100 only includes one of antennas 40L-1 and 40L-2, two of antennas 40H-1, 40H-2, 40H-3, and 40H-4 may be omitted without sacrificing coverage angles in the high frequency band for unit cell 100 (e.g., because a single one of antennas 40L-1 and 40L-2 may produce less shadowing than both antennas 40L-1 and 40L-2).

As shown in FIG. 9, patch element 60-1 may have edges 132 and patch element 60-2 may have edges 130 extending parallel to one of orthogonal axes 126 and 128 (e.g., patch elements 60-1 and 60-2 may be rectangular patches and/or may have rectangular lateral footprints). In the example of FIG. 9, patch element 60-1 has a cross-shape (e.g., corners of an otherwise rectangular patch may be removed) for impedance matching. This is merely illustrative. If desired, patch element 60-2 may have a cross shape and/or patch element 60-1 may have a completely rectangular shape. The edges of patch elements 60-1 and 60-2 may each be aligned with the sidewalls of cavity 122. In other words, axes 126 and 128, edges 132 of patch element 60-1, and edges 130 of patch element 60-2 may each extend parallel to a corresponding pair of the sidewalls of cavity 120 (e.g., parallel to a pair of the via fences laterally surrounding cavity 120).

Patch elements 60-3, 60-4, 60-5, and 60-6 in antennas 40H-1, 40H-2, 40H-3, and 40H-4 may be rotated at a non-parallel angle with respect to edges 132 of patch element 60-1 and edges 130 of patch element 60-2. For example, edges 138 of patch elements 60-3, 60-4, 60-5, and 60-6 may each extend parallel to one of orthogonal axes 136 and 134. Axes 136 and 134 may be oriented at a non-parallel angle with respect to axes 126 and 124 (e.g., by ten degrees, thirty degrees, forty-five degrees, between one and forty-five degrees, etc.). Edges 138 of each antenna 40H in unit cell 100 may oriented parallel to the edges 138 in each other antenna 40H in unit cell 100 or each antenna 40H in unit cell 100 may be provided with a respective orientation. In general, the edges 138 of patch elements 60-3, 60-4, 60-5, and 60-6 may extend at any desired non-parallel angles with respect to edges 130 of patch element 60-2 and edges 132 of patch element 60-1. In other words, the edges 138 of patch elements 60-3, 60-4, 60-5, and 60-6 may extend at any desired non-parallel angles with respect to the sidewalls of cavity 120 (e.g., with respect to the fences of conductive vias 122 in unit cell 100). Orienting patch elements 60-3, 60-4, 60-5, and 60-6 in this way may serve to minimize shadowing from antennas 40L-1 and 40L-2, to maximize isolation between the antennas 40H-1, 40H-2, 40H-3, and 40H-4 and the antennas 40L-1 and 40L-2 in unit cell 100, and to provide antennas 40H-1, 40H-2, 40H-3, and 40H-4 with as uniform a coverage area as possible, for example.

The example of FIG. 9 is merely illustrative. Patch elements 60-1 through 60-6 may have any desired shapes. Cavity 120 need not have a rectangular outline (e.g., cavity 120 may have a hexagonal outline if desired). Device 10 may include multiple unit cells such as unit cell 100 of FIG. 9 (e.g., to form a phased antenna array using antennas 40L).

Figure 10:
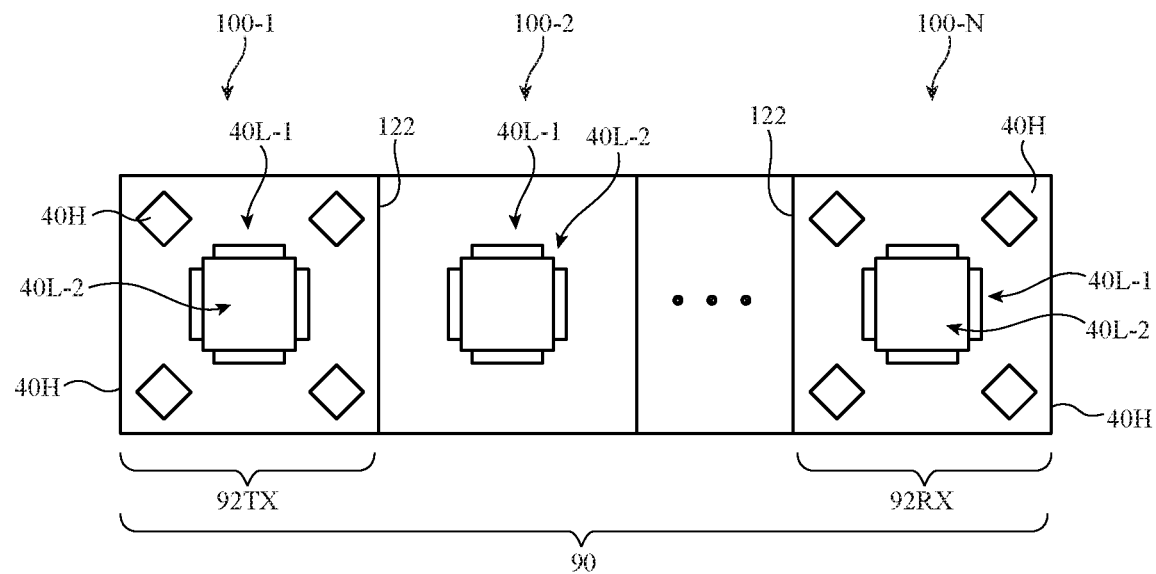
FIGS. 10 and 11 are top views of illustrative arrays of antennas for performing wireless communications and/or spatial ranging operations in accordance with some embodiments.

FIG. 10 is a top-down view showing how multiple unit cells 100 may be used to form a 1-by-N phased antenna array of antennas 40L. As show in FIG. 10, N unit cells 100 (e.g., a first unit cell 100-1, a second unit cell 100-2, an Nth unit cell 100-N, etc.) may be arranged in a single row. Each unit cell 100 may include corresponding antennas 40L-1 and 40L-2 (or only one of antennas 40L-1 and 40L-2 in scenarios where one of the antennas is omitted). Collectively, the antennas 40L-1 and 40L-2 in each unit cell 100 may form a single phased antenna array 90 for covering the first and/or second low frequency bands (e.g., antennas 40L-1 and 40L-2 in FIG. 10 may be provided with respective phases and magnitudes for performing beam steering). Phased antenna array 90 may be used to convey wireless data over a two-way wireless communications link such as wireless communications link 84 of FIG. 6.

One or more of the unit cells 100 may include a corresponding set of antennas 40H (e.g., antennas 40H-1, 40H-2, 40H-3, and/or 40H-4 of FIG. 9 formed at respective corners of that unit cell). In the example of FIG. 10, the unit cells at opposing ends of phased antenna array 90 (e.g., first unit cell 100-1 and Nth unit cell 100-N) are provided with antennas 40H. The antennas 40H in unit cell 100-1 may transmit radio-frequency signals (e.g., radio-frequency signals 86 of FIG. 6) in the high frequency band for performing spatial ranging operations. The antennas 40H in unit cell 100-N may receive radio-frequency signals (e.g., radio-frequency signals 88 of FIG. 6) in the high frequency band for performing spatial ranging operations. The antennas 40H in unit cell 100-1 may therefore sometimes be referred to herein as a set or array 92TX of transmit antennas (e.g., a transmit array 92TX) whereas the antennas 40H in unit cell 100-N are sometimes referred to herein as a set or array 92RX of receive antennas (e.g., a receive array 92RX). The antennas 40H in array 92TX may be provided with respective phases and magnitudes for performing beam steering (e.g., array 92TX may be a phased antenna array) or may not perform beam steering, if desired. Similarly, the antennas 40H in array 92RX may be provided with respective phases and magnitudes for performing beam steering (e.g., array 92RX may be a phased antenna array) or may not perform beam steering, if desired. Forming arrays 92TX and 92RX in unit cells 100 that are located as far apart as possible may serve to maximize isolation between arrays 92TX and 92RX (e.g., isolation between the transmitted and received radio-frequency signals used for performing spatial ranging operations).

The antennas 40L-1, 40L-2, and 40H within each of the unit cells 100 of FIG. 10 may be embedded within the same substrate if desired (e.g., substrate 104 of FIG. 8). Conductive walls (e.g., fences of conductive vias 122) may separate and electromagnetically isolate adjacent unit cells 100. Vias 122 may be omitted if desired.

Figure 11:
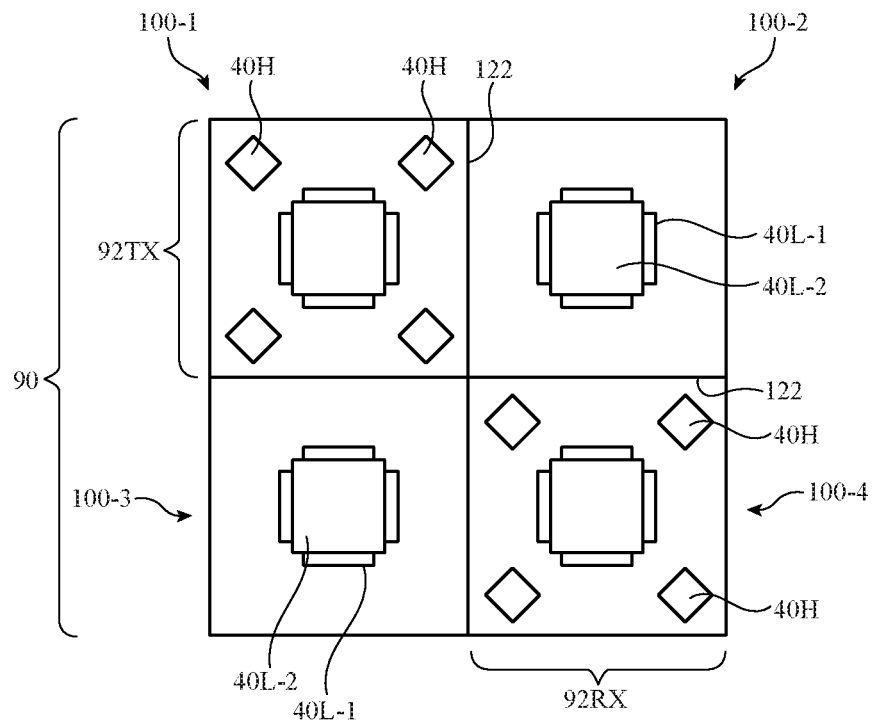

The example of FIG. 10 is merely illustrative. In general, any desired number of unit cells 100 may include a corresponding array of antennas 40H (e.g., each unit cell, two unit cells, one unit cell, etc.). Unit cells 100 may be arranged in other patterns (e.g., rectangular patterns having N columns and M rows, non-rectangular patterns, etc.). FIG. 11 shows an example in which four unit cells 100 are arranged in a rectangular pattern having two rows and two columns.

As shown in FIG. 11, phased antenna array 90 may include the antennas 40L-1 and 40L-2 from unit cells 100-1, 100-2, 100-3, and 100-4. Unit cells 100-1 and 100-2 may be arranged in a first row whereas unit cells 100-3 and 100-4 are arranged in a second row. Unit cells 100-1 and 100-3 may be arranged in a first column whereas unit cells 100-2 and 100-4 are arranged in a second column. Unit cell 100-1 may be provided with array 92TX of antennas 40H whereas unit cell 100-4 is provided with array 92RX of antennas 40H to maximize isolation between arrays 92RX and 92TX. The example of FIG. 11 is merely illustrative. Other patterns may be used. Any desired number of antennas 40H may be formed in any desired unit cells.

Antennas 40H (e.g., antennas 40H-1 and 40H-2 in FIG. 8, antennas 40H-1, 40H-2, 40H-3, and 40H-4 of FIG. 9, and/or antennas 40H of FIGS. 10 and 11) need not be used to perform spatial ranging operations and may, if desired, be used to perform bi-directional communications in the high frequency band with external wireless equipment (e.g., with external device 80 over wireless communications link 84 of FIG. 6). In this way, electronic device 10 may include multiple sets of antennas for performing wireless communications and/or spatial ranging operations using multiple millimeter and/or centimeter wave frequency bands within a relatively small space and without sacrificing radio-frequency performance.

The foregoing is merely illustrative and various modifications can be made by those skilled in the art without departing from the scope and spirit of the described embodiments. The foregoing embodiments may be implemented individually or in any combination.

What is claimed is:
1. An electronic device comprising:
a stacked dielectric substrate having a first, second, third, and fourth layers, the second layer being interposed between the first and third layers and the third layer being interposed between the second and fourth layers;
ground traces on the first layer;
a first antenna that includes a first patch element on the second layer and the ground traces;
a second antenna that includes a second patch element on the second layer and the ground traces, wherein the first and second antennas are configured to radiate in a first frequency band higher than 10 GHz;
a third antenna that includes a third patch element on the third layer and the ground traces, wherein the third antenna is configured to radiate in a third frequency band that is lower than the first frequency band; and
a fourth antenna that includes a fourth patch element on the fourth layer and the ground traces, wherein the fourth patch element at least partially overlaps the third patch element and the fourth antenna is configured to radiate in a fourth frequency band that is lower than the first frequency band.

2. The electronic device defined in claim 1, further comprising:
a fifth antenna that includes a fifth patch element on the second layer and the ground traces; and
a sixth antenna that includes a sixth patch element on the second layer and the ground traces, wherein the fifth and sixth patch elements are configured to radiate in the first frequency band.

3. The electronic device defined in claim 2, further comprising:
fences of conductive vias that extend through the stacked dielectric substrate and that laterally surround the first, second, third, fourth, fifth, and sixth patch elements.

4. The electronic device defined in claim 3, wherein the fences of conductive vias and the ground traces define edges of a cavity, the first antenna is located at a first corner of the cavity, the second antenna is located at a second corner of the cavity, the third antenna is located at a third corner of the cavity, and the fourth antenna is located at the fourth corner of the cavity.

5. The electronic device defined in claim 4, wherein the third and fourth patch elements are located at a center of the cavity.

6. The electronic device defined in claim 2, wherein the first, second, fifth, and sixth patch elements are rotated at a non-parallel angle with respect to the third and fourth patch elements.

7. The electronic device defined in claim 1, further comprising:
transceiver circuitry coupled to the first, second, third, and fourth antennas, wherein the transceiver circuitry is configured to convey radio-frequency signals using the first and second antennas; and
control circuitry, wherein the control circuitry is configured to perform spatial ranging operations using the radio-frequency signals conveyed by the first and second antennas.

8. The electronic device defined in claim 7, wherein the transceiver circuitry is configured to perform bi-directional communications with external wireless equipment using the fifth and sixth antennas.

9. The electronic device defined in claim 1, further comprising conductive walls laterally surrounding the first, second, third, and fourth patch elements, wherein the conductive walls and the ground traces define a conductive cavity for the first, second, third, and fourth antennas.

10. The electronic device defined in claim 1, wherein the fourth frequency band is higher than the third frequency band.

11. The electronic device defined in claim 10, wherein the first frequency band comprises frequencies between 57 GHz and 71 GHz, the second frequency band comprises frequencies between 27.5 GHz and 29.5 GHz, and the third frequency band comprises frequencies between 37 GHz and 41 GHz.

12. The electronic device defined in claim 10, wherein the stacked dielectric substrate comprises a fifth layer, the fourth layer is interposed between the third and fifth layers, and the electronic device further comprises:
a parasitic antenna resonating element on the fifth layer that at least partially overlaps the fourth patch element.

13. An electronic device comprising:
an array of antenna unit cells that includes first and second antenna unit cells, wherein each antenna unit cell in the array comprises a respective antenna configured to radiate in a first frequency band higher than 10 GHz;
a first set of antennas in the first antenna unit cell;

a second set of antennas in the second antenna unit cell, wherein the first and second sets of antennas are configured to convey radio-frequency signals in a second frequency band that is higher than the first frequency band; and control circuitry configured to perform spatial ranging operations using the radio-frequency signals conveyed by the first and second sets of antennas.

14. The electronic device defined in claim 13, wherein the first antenna unit cell comprises a first antenna configured to radiate in the first frequency band and second and third antennas from the first set of antennas, the second antenna is located at a first corner of the first antenna unit cell, and the third antenna is located at a second corner of the first antenna unit cell.

15. The electronic device defined in claim 14, wherein the first antenna comprises a first patch element located at a first distance over an antenna ground, the second antenna comprises a second patch element located at a second distance over the antenna ground that is less than the first distance, and the third antenna comprises a third patch element located at the second distance over the antenna ground.

16. The electronic device defined in claim 15, wherein the second and third patch elements lie outside of a lateral footprint of the first patch element.

17. The electronic device defined in claim 13, wherein the control circuitry is configured to transmit the radio-frequency signals using the first set of antennas and to receive a reflected version of the radio-frequency signals using the second set of antennas.

18. The electronic device defined in claim 17, wherein the first and second antenna unit cells are located on opposite sides of the array of antenna unit cells.

19. The electronic device defined in claim 17, wherein the first antenna unit cell is located in a first row and a first column of the array, the second antenna unit cell is located in a second row and a second column of the array, and the array further comprises a third antenna unit cell located in the second row and the first column of the array and a fourth antenna unit cell located in the first row and the second column of the array.

20. An electronic device comprising:
a phased antenna array configured to convey radio-frequency signals in a first frequency band, wherein the phased antenna array includes a first antenna radiating element within a first cavity and a second antenna radiating element within a second cavity;

a first set of antennas having antenna radiating elements that are located at respective corners of the first cavity and that are configured to transmit radio-frequency signals in a second frequency band that is different from the first frequency band;

a second set of antennas having antenna radiating elements that are located at respective corners of the second cavity and that are configured to receive radio-frequency signals in the second frequency band; and control circuitry configured to perform spatial ranging operations based on the radio-frequency signals in the second frequency band received by the second set of antennas.

* * * * *